United States Patent [19]
Hirano

[11] Patent Number: 4,589,506
[45] Date of Patent: * May 20, 1986

[54] COMBINATION WEIGHING SYSTEM

[75] Inventor: Takashi Hirano, Kobe, Japan

[73] Assignee: Yamato Scale Company, Ltd., Japan

[*] Notice: The portion of the term of this patent subsequent to May 31, 2000 has been disclaimed.

[21] Appl. No.: 619,493

[22] Filed: Jun. 11, 1984

Related U.S. Application Data

[63] Continuation of Ser. No. 443,959, Nov. 23, 1982, Pat. No. 4,470,166, which is a continuation of Ser. No. 268,696, Jun. 1, 1981, Pat. No. 4,385,671.

[30] Foreign Application Priority Data

May 30, 1980 [JP]  Japan ................................. 55-73525

[51] Int. Cl.$^4$ ............................................. G01G 19/22
[52] U.S. Cl. ............................................ 177/25; 177/1
[58] Field of Search ......................................... 177/1, 25

[56] References Cited

U.S. PATENT DOCUMENTS

| | | | |
|---|---|---|---|
| 4,336,852 | 6/1982 | Hirano | 177/25 |
| 4,344,492 | 8/1982 | Hirano | 177/25 |
| 4,385,671 | 5/1983 | Hirano | 177/25 |
| 4,470,166 | 9/1984 | Hirano | 177/1 |

Primary Examiner—George H. Miller, Jr.
Attorney, Agent, or Firm—Senniger, Powers, Leavitt and Roedel

[57] ABSTRACT

The method of delivering quantities of product measured by weight with each quantity being of an acceptable weight relative to a reference weight, utilizing a set of weighing devices each adapted to weigh a fraction of said quantity and each adapted for unloading of product therefrom to contribute to a delivery. The method comprises the steps of making a combination search to select a combination of the weighing devices to be unloaded to deliver said acceptable weight quantity, the search being made by generating the values of combinations of weights on the weighing devices excluding those devices which were selected in the preceding search and comparing the values with an acceptable weight standard, unloading the weighing devices of the selected combination for said delivery, and loading the weighing devices where were unloaded, wherein the combination search step of generating and comparing the values of the combinations of weights on the weighing devices which were selected in the preceding search is initiated before completion of weighing out new loads on those devices. Apparatus for carrying out this method is also disclosed.

12 Claims, 14 Drawing Figures

COMBINATION WEIGHING SYSTEM

This is a continuation of application Ser. No. 443,959, filed Nov. 23, 1982, now U.S. Pat. No. 4,470,166, which in turn is a continuation of application Ser. No. 268,696, filed June 1, 1981, issued May 31, 1983 as U.S. Pat. No. 4,385,671.

BACKGROUND OF THE INVENTION

This invention relates to an improved combination weighing method and apparatus providing increased efficiency.

A weighing device, which is generally referred to as a "combination balance" or "combination weighing device", is used for extracting a plurality of articles from a group of articles, such as candies, fruits and vegetables, having relatively large variances in respective weights, to form a sub-group having a weight approximating a predetermined intended weight which will be hereinunder referred to as "reference weight". An example of such a device is disclosed in U.S. Pat. No. 3,939,928 and another example is described in the published British patent specification No. GB2039374A. In these devices, a plurality of articles are weighed individually by a plurality of weighing balances at the same time, all mathematical combinations of the respective weights are summed respectively and the resultant sums are successively compared with a predetermined range of weight for the reference weight. Thus, the combination providing a sum falling within this range is selected for use.

The device also includes automatic loading and unloading means, by which the selected balances are unloaded for collection of the articles thereon into a pack and then loaded with new articles. Upon completion of the loading operation, a cycle of operation of the device is completed and, then, the next cycle is executed similarly. In other words, each cycle of operation of the prior art combination weighing device consists of the steps of combination selection, unloading the selected balances, loading the same balances and, if necessary, transference of the collected articles, and this cycle is repeated periodically.

When the number of weighing balances selected every time is substantially less than the number of remaining ones, a desired combination may be included in the remaining balances. In the prior art device, however, such combination is not taken into consideration until the next cycle of operation is initiated. As the time for combination selection is significantly shorter than the time for unloading and loading, it would be time-saving if the combination selection from the remaining balances could be effected during the unloading step of the preceding cycle and, if a desired combination should be obtained, the corresponding balances could be unloaded after the unloading step or during the loading step of the preceding cycle.

Accordingly, an object of this invention is to provide a combination weighing system which can effect such a partially superposed cycle of operation to increase the device operation.

As well known in the art, the signal level indicative of the measured weight of the weighing balance exhibits characteristic damped vibration after loading and unloading operations and a certain length of time is needed for providing a stable signal level. In the prior art combination weighing system, the time of each cycle of operation is estimated taking this stabilizing time into account and fixedly preset in the device so that each combination selection is initiated after the selected balances have been loaded again and then become stable.

According to a principle of this invention, however, means are provided for inhibiting those balances which are in unstable state to enter into combination, and for effecting combination selection exclusive of these unstable balances and storing a desired combination, if obtained, for the next unloading operation.

These and other objects and features of this invention will be described in more detail hereinunder with reference to the accompanying drawings.

IN THE DRAWINGS

Figure 6:
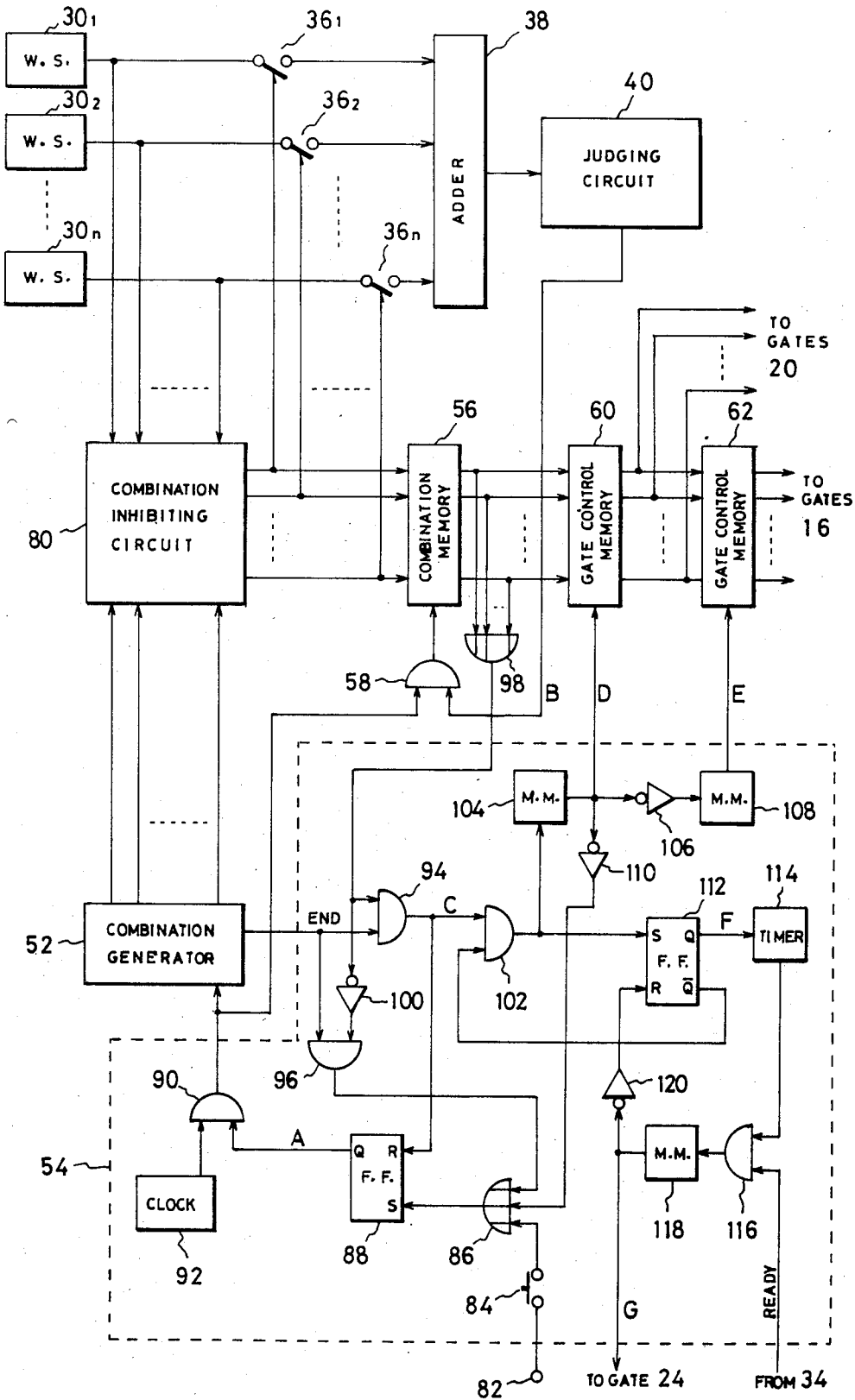
FIG. 6 is a block diagram representing a preferred embodiment of a combination weighing system to which this invention is applied.
Figure 9A:
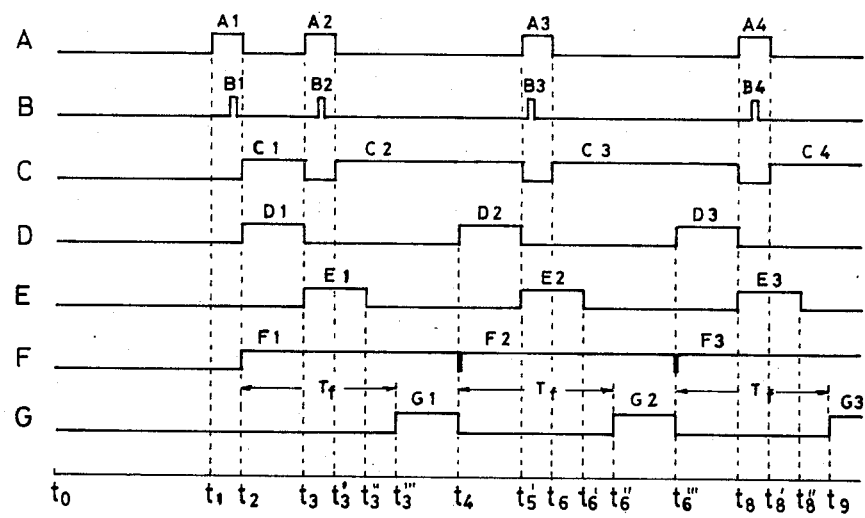
Figure 9B:
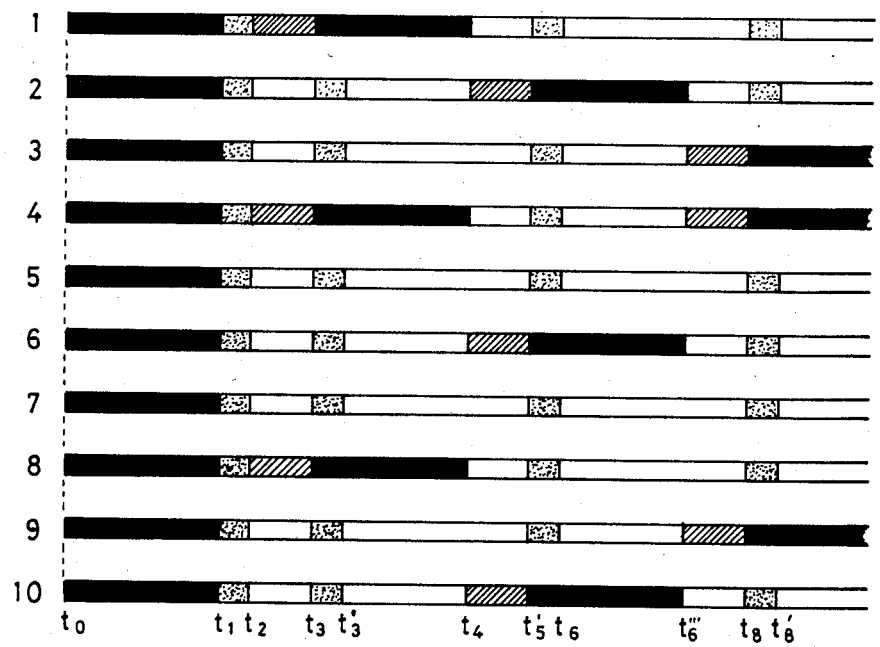
Figure 10A:
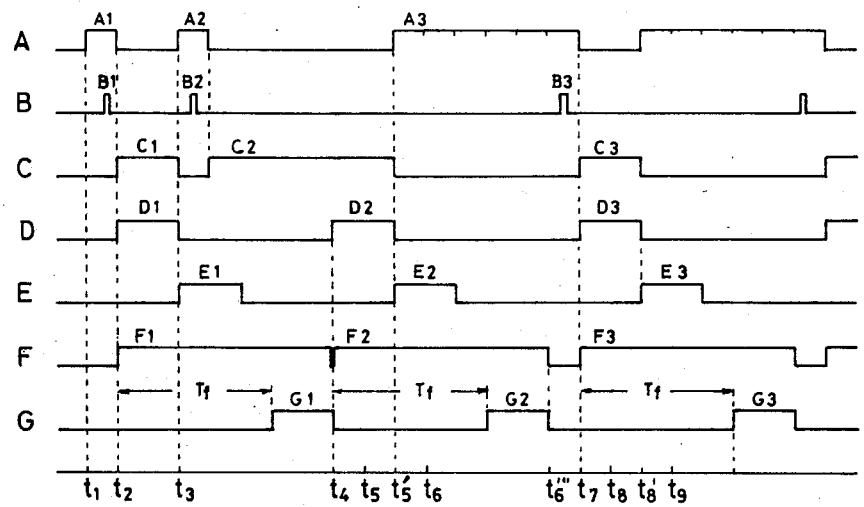
Figure 10B:
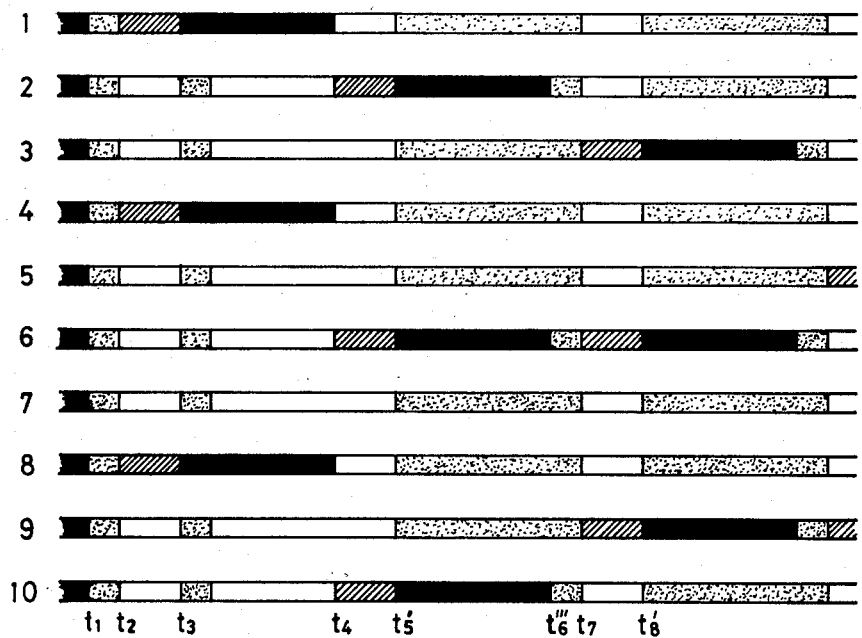
Figure 11:
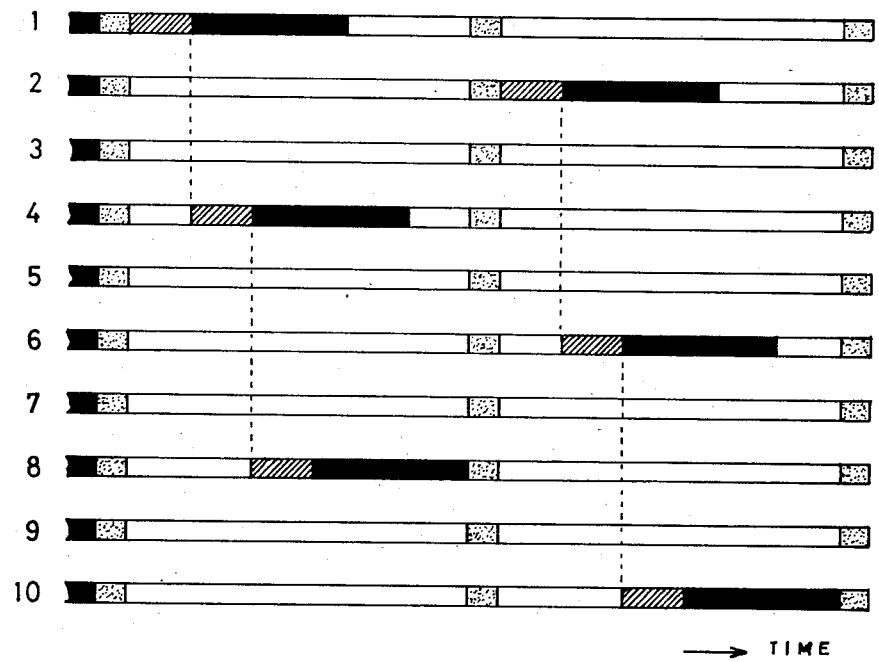
Figure 12:
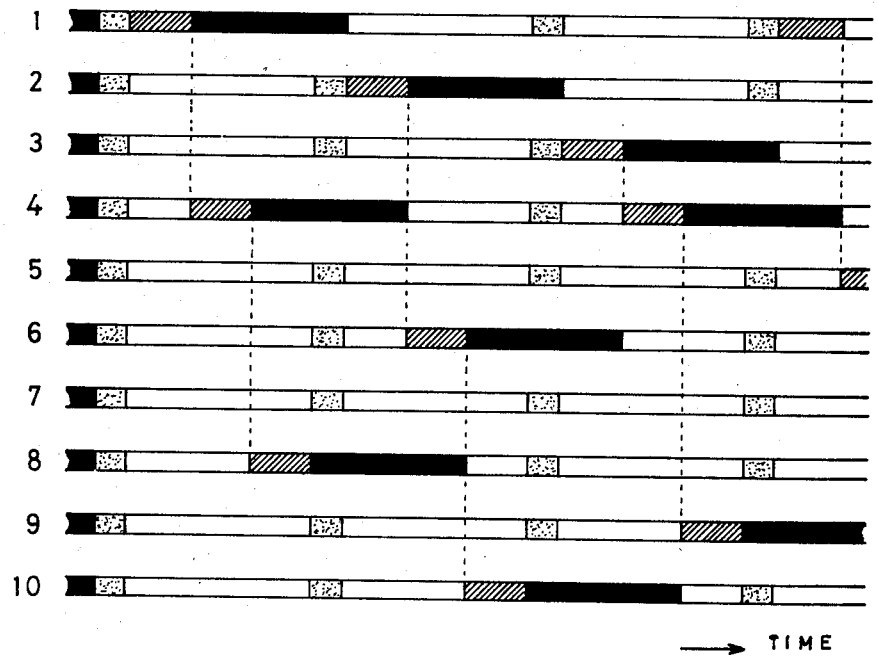

FIGS. 9(a) and 9(b) and FIGS. 10(a) and 10(b) are diagrams representing signal waveforms appearing in the circuit of FIG. 6 and corresponding process charts used for an aid of explanation; and FIGS. 11 and 12 are process charts for manually operated systems according to the prior art and this invention, respectively.

Throughout the drawings, like reference numerals are used to denote corresponding structural components.

Figure 1:
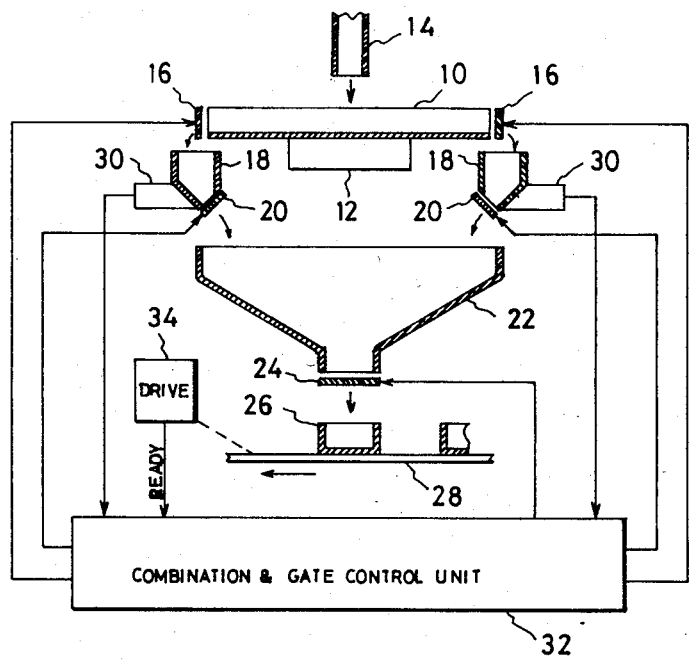
FIG. 1 is a schematic diagram representing an example of an automatic combination weighing system to which this invention is applied effectively.

Referring to FIG. 1, there is shown in a schematic view the mechanical section of a typical automatic combination weighing system in which this invention is embodied. The system includes a vibration feeder 10 consisting of a generally flat circular disc having a peripheral wall. The feeder 10 is provided with a vibrator 12 for applying circumferential or rotational vibration to the disc so that articles supplied from a central chute 14 onto the disc are shifted spirally outwards to the peripheral portion. The peripheral wall of the feeder 10 has a plurality of exit ports having gates 16, respectively, which are normally closed and selectively opened under control of loading signals from a combination and gate control unit 32 as described later. The system also includes a plurality of weighing balances arranged surrounding the feeder 10 so that their weighing cradles 18 are disposed respectively just under the exit ports of the feeder 10. It is understood that the articles on the feeder 10 are fed into each weighing cradle 18 for loading the cradle when the corresponding gate 16 is opened. Each weighing cradle 18 has a bottom opening having a gate 20 which is normally closed and selectively opened under control of an unloading signal from the combination and gate control unit 32 for unloading the cradle as described later. Each weighing balance also includes a weight sensor 30, such as a load cell, which produces an electric signal indicative of the weight of articles in the cradle 18 and supplies it to the combination and gate control unit 32. Under the gates 20, a common collecting hopper 22 is disposed for collecting the articles discharged (delivered) from some of the weighing cradles 18. The hopper 22 has a bottom opening having a gate 24 which is normally closed and opened under control of a discharge signal from the combination and gate control unit 32 as also described later, to discharge the articles collected in the hopper 22 into suitable vessels or boxes 26 moved intermittently under the hopper by a belt conveyor 28 or the like. The conveyor 28 is driven under control of a driving unit 34 which supplies a ready signal to the combination and gate control unit 32 when each vessel 26 is disposed just under the hopper 22.

Figure 2:
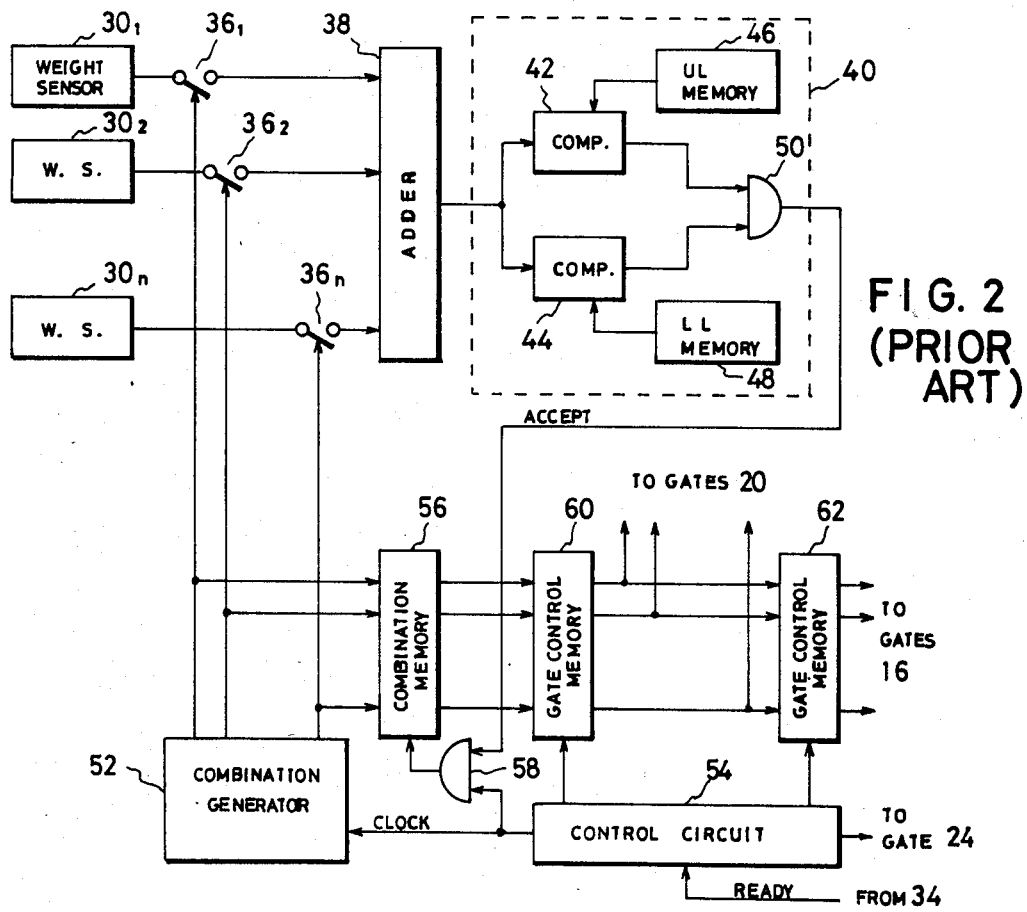
FIG. 2 is a block diagram representing an example of a combination selection and gate control circuit of the system of FIG. 1 according to the prior art.

Now, the arrangement and operation of the combination and gate control unit 32 will be described with reference to FIG. 2 showing an example of prior art.

The outputs of the weight sensors $30_1, 30_2, \ldots 30_n$ of the weighing balances (FIG. 1) are coupled respectively through a plurality of normally-open switches $36_1, 36_2, \ldots 36_n$, each having a control terminal, to an adder circuit 38. The adder circuit 38 serves to sum up the input signals to produce a sum signal fed to a judging circuit 40. In this embodiment, the judging circuit 40 includes a pair of comparators 42 and 44 having first inputs for receiving the sum signal from the adder 38 and second inputs coupled respectively to upper and lower limit memories 46 and 48. The upper and lower limit memories 46 and 48, each having an input device such as a conventional digital keyboard (not shown), store predetermined upper and lower limits of the allowable range of weight for each "sub-group" of articles as aforementioned. The comparators 42 and 44 compare the sum signal from the adder 38 with these upper and lower limits and produce outputs at the same time when the sum is within the predetermined range. These outputs are coupled to both inputs of an AND circuit 50 to produce an acceptance signal.

The control terminals of the normally-open switches $36_1, 36_2, \ldots 36_n$ are coupled respectively to n-number of output terminals of a combination generator 52. The combination generator 52 is driven by a train of clock pulses from a clock pulse generator included in a control circuit 54 to produce a predetermined set of mathematical combinations of output signals from its selected output terminals. For example, if the predetermined set of combinations are complete mathematical combinations of the n-number of outputs, the combination generator 52 may be an n-bit binary counter having a control input receiving the clock pulses and n-number of parallel outputs coupled respectively to its output terminals. In this case, logic "high" level or binary "1" serves as the output signal from each output terminal of the combination generator 52. As well known by those skilled in the art, the total number of such combinations is $2^n - 1$ and the combination generator 52 produces $(2^n - 1)$ sets of output signals successively in synchronism with the applied clock pulses. Thus, the weight indicating signals from the weight sensors $30_1, 30_2, \ldots 30_n$ are successively applied to the adder 38 in accordance with these combinations.

The outputs of the combination generator 52 are also supplied successively to a combination memory 56 having corresponding input and output terminals. The combination memory 56 also has a control input coupled to the output of an AND circuit 58 having two inputs for receiving the clock pulses from the control circuit 54 and the acceptance signal from the judging circuit 40, respectively. Thus, when the total weight of articles combined in accordance with the outputs of the combination generator 52 falls within the predetermined range, the acceptance signal is applied through the AND circuit 58 to the control terminal of the combination memory 56 in synchronism with the clock pulses. The combination memory 56 is arranged to store the incoming signals and supply them to an unloading gate control memory 60 under control of the input control signal. As such type of memory is well known in the art, its details will not be described further.

The unloading gate control memory 60 is similar in structure and function to the combination memory 56. That is, it has a control input for receiving an unloading gate control signal from the control circuit 54 and serves to store the incoming signals and supply them to the corresponding unloading gates 20 (FIG. 1) and also to a loading gate control memory 62, under control of the unloading gate control signal. The memory 62 is quite similar to the memory 60 and serves to store the incoming signals and supply them to the corresponding loading gates 16 (FIG. 1) under control of a loading gate control signal applied to its control terminal from the control circuit 54. Thus, the articles on those weighing balances selected in accordance with the accepted combination are delivered into the hopper 22 (FIG. 1) under control of the outputs of the unloading gate control memory 60 and the unloaded balances are loaded again with new articles under control of the outputs of the loading gate control memory 62. After the balances are unloaded and when the ready signal is applied from the driving unit 34 (FIG. 1) to the control circuit 54, the control circuit 54 supplies a discharge signal to the gate 24 (FIG. 1) to discharge the articles collected in the hopper 22 into the vessel 26. Detailed circuit configuration and function of the control circuit 54 will be described later in conjunction with the arrangement of FIG. 6.

Figure 3:
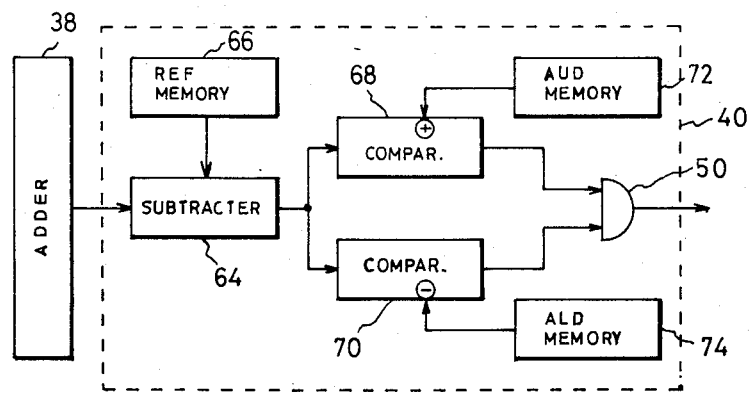
FIG. 3 is a block diagram representing an alternative arrangement of a part of the system of FIG. 2.

FIG. 3 shows an alternative of the judging circuit 40 of FIG. 2. In this arrangement, the aforementioned sum signal of the adder circuit 38 is applied to a subtracter circuit 64 having a second input coupled to a reference weight memory 66 for storing a predetermined "reference weight". The subtractor 64 subtracts the sum from the "reference weight" to produce a deviation signal indicative of deviation of the total weight of the "sub-group" from the "reference weight". It should be noted that the output of the subtracter 64 may be positive, zero or negative and the subsequent arithmetic operation is executed taking the polarities of values into consideration. The deviation signal from the subtracter 64 is then applied to a pair of comparators 68 and 70 having second inputs coupled respectively to allowable upper deviation (AUD) memory 72 and allowable lower deviation (ALD) memory 74 which are basically the same as the memories 46, 48 (FIG. 2) and 66 and store predetermined allowable upper and lower deviations from the "reference weight", respectively. It is to be noted also that the content of the AUD memory 72 is always positive (plus), while the content of the ALD memory 74 is always negative (minus). It can be understood that the AND circuit 50 will produce an acceptance signal when the deviation falls within the allowable range.

Although many other modifications of the judging circuit can be considered, no further description will be made thereon since they have no direct connection to this invention.

Figure 4:
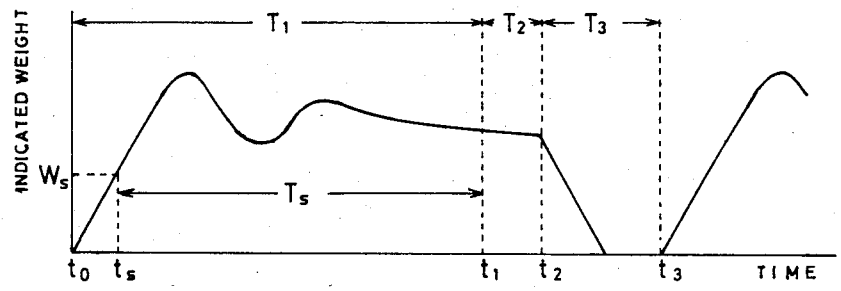
FIG. 4 is a graph representing time-base change of the weight signal level of a typical weighing balance used in the system in question.

In the graph of FIG. 4 wherein time and weight are indicated on the abscissa and ordinate, respectively, when the loading gate 16 (FIG. 1) is opened to begin loading the weighing balance with articles at time $t_0$, the signal level appearing at the output of the weight sensor 30 varies along the curve as shown, and becomes substantially stable at time $t_1$ after a specific time interval $T_1$. Accordingly, the combination selecting operation (i.e., the combination search) is effected from time $t_1$ to time $t_2$ for a time interval $T_2$ and, if a desired combination is obtained inclusive of this balance, the unloading gate 20 (FIG. 1) is opened to begin unloading the balance at time $t_2$. After a further time interval $T_3$ for which the balance is unloaded and the unloading gate 20 is closed, the balance is loaded again at time $t_3$. This behavior is substantially common to all of the weighing balances within a similar system and the minimum period T of operation of each balance is indicated as $T = T_1 + T_2 + T_3$.

Figure 5:
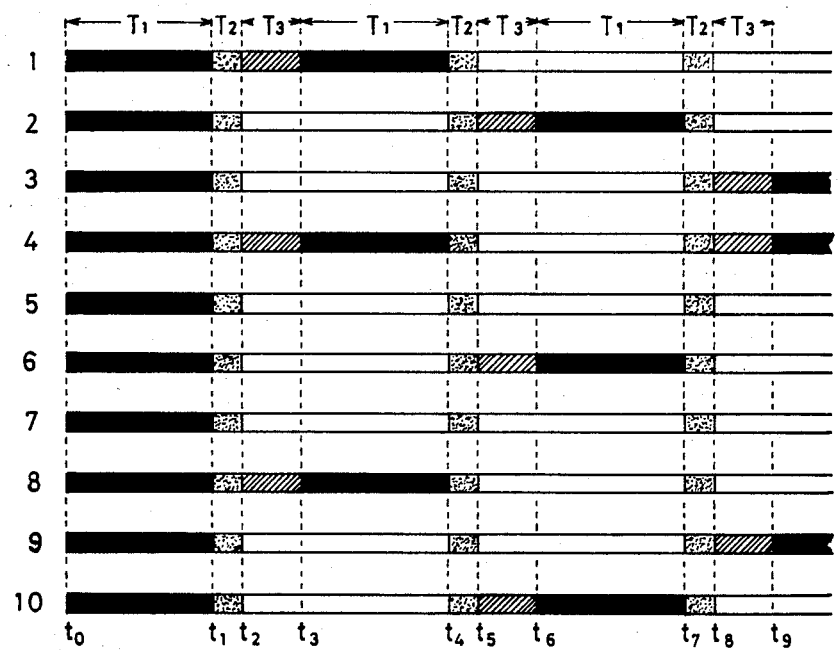
FIG. 5 is a chart representing relative operational relationship of respective weighing balances of a prior art system.

In the prior art system, all of the weighing balances enter into combination selection and each combination selecting operation (i.e., the combination search) is effected while all the balances are in their stable state after time $t_1$. Thus, the operational schedule of prior art system having ten weighing balances as an example is as shown in FIG. 5. In the drawing, it is assumed that all the balances were, at first, loaded simultaneously at time $t_0$ and stabilized at time $t_1$ as shown by black regions. Then, a combination selecting operation was effected from time $t_1$ to time $t_2$ for all of the ten balances as shown by dotted regions and the balances Nos. 1, 4 and 8 were selected out. These selected balances 1, 4 and 8 were then unloaded from time $t_2$ and became ready for loading at time $t_3$ as shown by shadowed regions. Then, the balances 1, 4 and 8 were loaded again and stabilized from time $t_3$ to time $t_4$ and a second combination selection was effected from time $t_4$ to time $t_5$ to select out the balances 2, 6 and 10 which were then unloaded from time $t_5$ to time $t_6$. It can be understood that the same cycle of operation is repeated at the same period T $(=T_1+T_2+T_3)$. More particularly, the control circuit 54 is arranged to drive the combination generator 52 at period T for time $T_2$, in the prior art system.

In this case, however, it would be time-saving if it should be possible to execute the second cycle of operation for the balances 2, 6 and 10 just after $t_2$ exclusive of the balances 1, 4 and 8. The feature of this invention is the provision of means for inhibiting selected balances, such as 1, 4 and 8 from entering into combination and means for starting the next cycle of operation regardless of the state of these selected balances. An embodiment of this invention will be described hereinunder with reference to FIG. 6.

The upper half of this circuit is similar to the circuit of FIG. 2 except that a combination inhibiting circuit 80 is inserted between the normally-open switches 36 and combination memory 56 and the combination generator 52 in order to prevent unstabilized balances from entering into combination.

Figure 7:
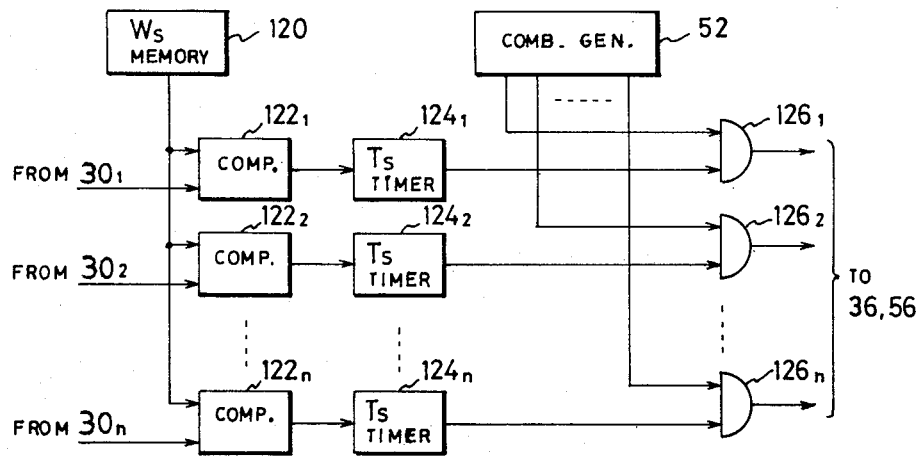
FIG. 7 is a block diagram representing an embodiment of a combination inhibiting circuit included in FIG. 6.

An embodiment of the combination inhibiting circuit 80 is shown in FIG. 7. The ultimate purpose of this circuit is to determine the time point at which a loaded weighing balance reaches a stable state. In order to realize it, a specific weight $W_s$ is selected as a very small threshold reference which is sufficiently smaller than the allowable minimum weight of the balance and compared with the sensed weight to detect a time point $t_s$ which is near the original time point $t_0$ of the rising load. In the theoretical respect, it is desirable to start measurement of time from the time point $t_0$. However, as it is practically difficult to detect the time point $t_0$, the measurement is started from the time point $t_s$ and, after a predetermined time period $T_s$ preset in a timer, a signal indicating the stable state having been reached is obtained. The circuit of FIG. 7 includes a memory 120 for storing the weight $W_s$ and applying it to first inputs of a plurality of comparators $122_1, 122_2 \ldots 122_n$. The weight indicating signals from the weight sensors $30_1, 30_2, \ldots 30_n$ are also coupled to second inputs of the respective comparators 122. The comparators 122 are arranged to produce outputs when the second inputs are greater than the first inputs, that is, when the time point $t_s$ is reached. The outputs of the comparators $122_1, 122_2, \ldots 122_n$ are coupled respectively to timers $124_1, 124_2, \ldots 124_n$. Each timer 124 is arranged to start operation in response to the leading edge of the output of the comparator 122 and produce an output after lapse of the time period $T_s$ (FIG. 4). The outputs of the timers $124_1, 124_2, \ldots 124_n$ are coupled respectively to first inputs of AND circuits $126_1, 126_2, \ldots 126_n$ having second inputs coupled respectively to the corresponding outputs of the combination generator 52. The outputs of the AND circuits 126 are coupled respectively to the control terminals of the corresponding normally-open switches 36 and to the corresponding inputs of the combination memory 56. It will be self-explanatory that the comparators 122 inform the time point $t_s$ and the timers 124 inform the time point $t_1$ and open the corresponding AND gates 126 to pass the corresponding outputs of the combination generator 52. In other words, the outputs of the combination generator 52 are disconnected until the corresponding balances become stable. When the balance is unloaded at time point $t_2$ and the weight signal level drops below the value $W_s$, the output of the comparator 122 disappears and the timer 124 is reset.

Figure 8:
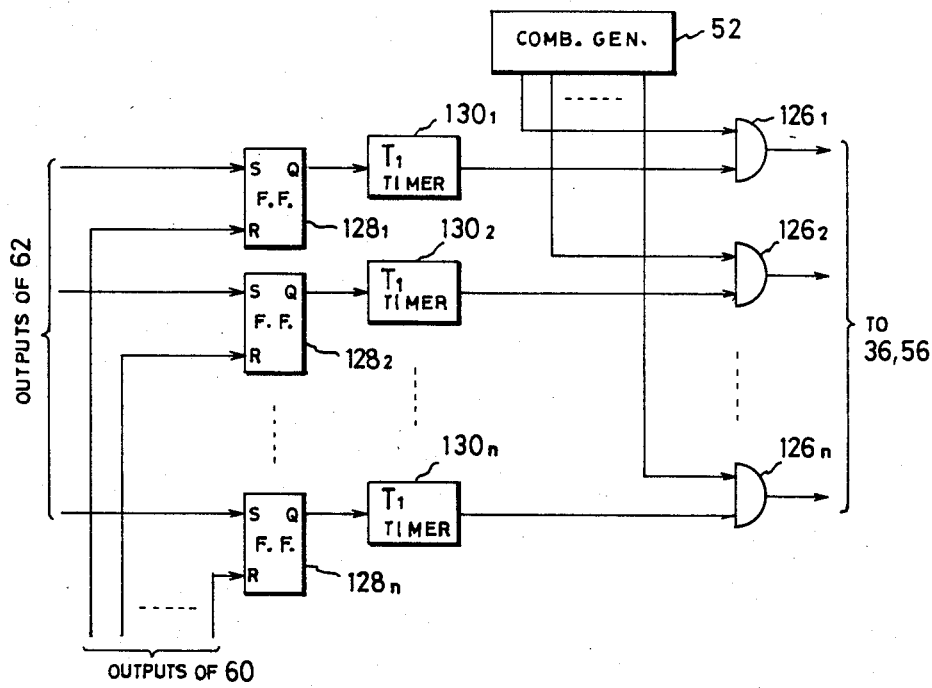
FIG. 8 is a block diagram representing another embodiment of a combination inhibiting circuit included in FIG. 6.

FIG. 8 shows another embodiment of the inhibiting circuit 80. The principle of this circuit is to detect the time point $t_0$ and disconnect the corresponding outputs of the combination generator 52 until the time point $t_1$ is reached after the predetermined time interval $T_1$. The circuit includes a pllurality of flip-flops $128_1, 128_2, \ldots 128_n$ having set inputs coupled respectively to the corresponding outputs of the loading gate control memory 62 and the reset inputs of which are coupled respectively to the corresponding outputs of the unloading gate control memory 60, so that the flip-flops are set when the corresponding loading gates 16 are opened and reset when the corresponding unloading gates are opened. In other words, each flip-flop 128 is set at time $t_0$ and reset at time $t_2$. The Q-outputs of the flip-flops 128 are coupled respectively to a plurality of timers $130_1, 130_2, \ldots 130_n$. Each timer 130 is arranged to start operation in response to the leading edge of the Q-output of the flip-flop 128 and produce an output after lapse of the predetermined time interval $T_1$. Similar to the circuit of FIG. 7, the outputs of the timers 130 and the corresponding outputs of the combination generator 52 are coupled respectively through AND circuits 126 to the corresponding normally-open switches 36 and the combination memory 56. It will be self-explanatory that the outputs of the combination generator 52 are disconnected during the time intervals $T_1$ and $T_3$ (FIG. 4).

Returning to FIG. 6, the control circuit 54 (dashed block) according to this invention includes a normally-open push button switch 84 coupled between a "high" level terminal 82 and first input of an OR circuit 86. The output of the OR circuit 86 is coupled to the set input of a flip-flop 88 having its Q-output coupled to one input of an AND circuit 90 another of which is coupled to a clock pulse generator 92. The output of the AND circuit 90 is coupled to the combination generator 52 and to the AND circuit 58 as aforementioned. The combination generator 52 is driven by the clock pulses from the clock generator 92 to produce combination outputs successively to the combination inhibiting circuit 80 and, when a cycle of combination selecting operation is completed, produce an end signal to first inputs of AND circuits 94 and 96. The second input of the AND circuit 94 is coupled to the output of an OR circuit 98 having inputs coupled to the outputs of the combination memory 56. The output of the OR circuit 98 is also coupled through an invertor 100 to the second input of the AND circuit 96. The output of the AND circuit 96 is coupled to a second input of the OR circuit 86. The output of the AND circuit 94 is coupled to first input of an AND circuit 102 and to the reset input of the flip-flop 88. The output of the AND circuit 102 is coupled through a monostable multivibrator 104 to the control input of the unloading gate control memory 60 and also coupled through an invertor 106 and a monostable multivibrator 108 to the control input of the loading gate control memory 62. The output of the monostable multivibrator 104 is further coupled through an invertor 110 to a third input of the OR circuit 86. The output of the AND circuit 102 is also coupled to the set input of a flip-flop 112 having its Q-output coupled to a timer 114 and its e,ovs/Q/ -output returned to the second input of the AND circuit 102. The output of the timer 114 is coupled to one input of an AND circuit 116 to another input of which is supplied the ready signal from the driving unit 34 (FIG. 1). The output of the AND circuit 116 is coupled through a monostable multivibrator 118 and an invertor 120 to the reset input of the flip-flop 112. The output of the multivibrator 118 is also coupled as the discharge signal to the gate 24 (FIG. 1).

Now the operation of the circuit of FIG. 6 will be described with reference also to FIGS. 9(a) and 9(b) in which the same combination schedule as FIG. 5 was executed by the circuit of FIG. 6.

Assuming that all of the balances No. 1 through No. 10 have been loaded and the flip-flops 88 and 112 are in reset state, at first, the push-button switch is pushed to apply a "high" level signal to the OR circuit 86 at time $t_1$. Then, the flip-flop 88 is set by the output of the OR circuit 86 to produce an output $A_1$ in waveform A to open the AND gate 90 to supply the clock pulses from the clock generator 92 to the combination generator 52, thereby initiating the first combination selection cycle. During this cycle, the weighing balances Nos. 1, 4 and 8 are selected as in the case of FIG. 5 and an acceptance signal $B_1$ in waveform B is produced from the judging circuit 40 to open the AND gate 58, thereby applying the clock pulse from the clock generator 92 to the control input of the combination memory 56. Thus, the combination memory 56 produces outputs corresponding to the balances 1, 4 and 8 to the gate control memory 60 and also to the OR circuit 98. Accordingly, the OR circuit 98 supplies its output to the AND gate 94 to open it. When the cycle of combination selection is completed, the combination generator 52 produces an end signal which is supplied through the opened AND gate 94 to the AND gate 102 as shown by $C_1$ in waveform C and also supplied to the reset input of the flip-flop 88 to reset it to deactuate the combination generator 52 at time $t_2$. As shown by dotted regions in FIG. 9(b), between the times $t_1$ and $t_2$, all of the weighing balances enter into the combination selecting operation (i.e. a combination search).

As the flip-flop 112 is in the reset state and $\overline{Q}$-output is applied to the AND gate 102, the AND gate 102 actuates the monostable multivibrator 104 to produce a gate signal $D_1$ at time $t_2$, which will end at time $t_3$, and apply it to the control input of the unloading gate control memory 60. Thus, the memory 60 produces outputs corresponding to its inputs and apply them to the unloading gates 20 of the corresponding balances 1, 4 and 8 to unload them as shown by shadowed regions in FIG. 9(b) between the times $t_2$ and $t_3$. The trailing edge of the unloading signal $D_1$ is applied through the invertor 106 to actuate the monostable multivibrator 108 at time $t_3$. The multivibrator 108 supplies a loading signal $E_1$ in waveform E, which will end at time $t_3''$ to the control input of the loading gate control memory 62. Thus, the memory 62 supplies the inputs from the memory 60 to the loading gates 16 of the corresponding balances to load them again between the times $t_3$ and $t_3''$.

As a feature of this invention, the trailing edge of the unloading signal $D_1$ is also applied through the invertor 110 and OR circuit 86 to the flip-flop 88 to set it again to produce an output $A_2$ at time $t_3$, thereby initiating a combination selection operation (i.e., a combination search) again as shown by dotted regions in FIG. 9(b) between the times $t_3$ and $t_3'$ regardless of instability of the balances 1, 4 and 8. During this second cycle of combination selection, the balances Nos. 2, 6 and 10 are selected as in the case of FIG. 5 and an acceptance signal $B_2$ is produced.

In addition, the flip-flop 112 is set by the output of the AND circuit 102 to produce a Q-output $F_1$ in waveform F at time $t_2$ to actuate the timer 114. The timer 114 is arranged to produce an output after a predetermined time $T_f$ as shown in FIG. 9(a). After the time $T_f$, the timer 114 applies an output to the AND gate 116 to open it, thereby passing the ready signal from the driving unit 34 (FIG. 1) to the monostable multivibrator 118 to actuate it at time $t_3'''$. The multivibrator 118 produces an output $G_1$ in waveform G, which will end at time $t_4$, and apply it as the discharge signal to the gate 24 (FIG. 1), thereby discharging the articles collected in the hopper 22 into the vessel 26 as aforementioned in conjunction with FIGS. 1 and 2. The trailing edge of the signal $G_1$ is applied through the invertor 120 to the flip-flop 112 to reset it, thereby applying its $\overline{Q}$-output to the AND gate 102 to open it.

As abovementioned, however, the acceptance signal $B_2$ is produced during the combination cycle $A_2$ and the output $C_2$ of the AND circuit 94 is produced again at time $t_3'$. This output $C_2$ is applied through the opened AND gate 102 to the multivibrator 104 to produce a second unloading signal $D_2$ and also to the flip-flop 112 to set it again at time $t_4$ as shown by $F_2$. Thus, the weighing balances 2, 6 and 10 are unloaded between the times $t_4$ and $t_5'$ as shown by shadowed regions in FIG. 9(b). The subsequent sequence of operation is executed similarly as shown in FIGS. 9(a) and 9(b).

Comparing FIG. 9(b) with FIG. 5, it will be clear that the system of this invention affords a time-saving over the prior art system.

FIGS. 10(a) and 10(b) show the operation of the system of FIG. 6, wherein no desired combination could be selected during the third cycle though the first and second cycles were same as those in FIGS. 9(a) and 9(b).

As shown in the drawings, the balances Nos. 1, 4 and 8 were selected during the period $A_1$ and Nos. 2, 6 and 10 were selected during the period $A_2$. At time $t_5'$, the flip-flop 86 was set again by the trailing edge of the unloading signal $D_2$ as aforementioned, and the combination generator 52 was actuated again as shown by $A_3$ exclusive of the balances 2, 6 and 10. However, as assumed, no desired combination was found during the starting cycle between the times $t_5'$ and $t_6$. In this case, no input signal is applied to the OR circuit 98 and no output C is applied to the reset input of the flip-flop 88. Moreover, an inverted version of the output of OR circuit 98 is applied with the end signal from the combination generator 52 to the AND gate 96 at time $t_6$, thereby the output of the AND gate 96 is applied through the OR circuit 86 to the flip-flop 88 to set it continuously. Thus, the combination selecting operation is repeated. However, no desired combination can be found until the balances 2, 6 and 10 enter into combination at time $t_4'''$, and the combination selecting operation is repeatedly continued after time $t_5'$ as shown by dotted regions in FIG. 10(b). However, if a desired combination of balances, such as the balances 3, 6 and 9, is found during the cycle after the time $t_4'''$, the circuit 54 of FIG. 6 produces unloading and loading signals $D_3$ and $E_3$ and also a discharge signal $G_3$ in the same manner as in the first and second cycles of operation.

The time saving property of the system of this invention is particularly significant when the system is used in partially manual operation. In this case, loading and unloading operations are executed manually by operators and, therefore, the system has neither the gate control memories 60 and 62 nor the elements therefor in the control circuit 54. The selected balances are indicated by pilot lamps, for example, actuated by the outputs of the combination memory 56. It can be understood that, in this case, the selected balances will be unloaded and then loaded sequentially rather than simultaneously as shown in FIGS. 11 and 12 for the prior art and inventive systems, respectively, in the same time scale. Both drawings are self-explanatory from the foregoing description and it should be understood that the system of this invention is significantly time-saving as compared with the prior art system.

Although the invention has been described heretofore merely in conjunction with certain embodiments, it should be noted that various modifications and changes can be done without departing from the scope of this invention as defined in the appended claims.

What is claimed is:

1. The method of delivering quantities of product measured by weight with each quantity being of an acceptable weight relative to a reference weight, utilizing a set of weighing devices each adapted to weigh a fraction of said quantity and each adapted for unloading of product therefrom to contribute to a delivery, said method comprising the steps of:

making a combination search to select a combination of said devices to be unloaded to deliver said acceptable weight quantity, said search being made by generating the values of combinations of weights on said devices excluding those devices which were selected in the preceding search and comparing the values with an acceptable weight standard;

unloading the weighing device of the selected combination for said delivery; and loading the weighing devices which were unloaded;

and wherein the combination search step of generating and comparing the values of the combinations of weights on the weighing devices excluding those devices which were selected in the preceding search is initiated before completion of weighing out new loads on those devices.

2. The method of claim 1 wherein the combination search step is carried out before the weighing devices which were selected in the preceding search are re-loaded and reach stabilization.

3. Apparatus for delivering quantities of product by weight, with each quantity being of an acceptable weight relative to a reference weight, comprising:

a set of weighing devices each adapted to weigh a fraction of said quantity and each adapted for unloading of product therefrom to contribute to a delivery;

means for making a combination search to select a combination of said devices to be unloaded to deliver said acceptable weight quantity, said means being operable to make said search by generating the values of combinations of weights on said devices excluding those devices which were selected in the preceding search and comparing the values with an acceptable weight standard;

means for unloading the weighing devices of the selected combination for said delivery;

means for loading the weighing devices which were unloaded; and means for initiating operation of said combination search means to select a combination of weights on the participating weighing devices before completion of weighing out new loads on the weighing devices selected in the preceding search.

4. Apparatus as set forth in claim 3 wherein the last-named means is operable to initiate operation of said combination search means to select a combination of weights on the participating weighing devices before the weighing devices which were selected in the preceding search are re-loaded and reach stabilization.

5. The method of delivering quantities of product measured by weight with each quantity being of an acceptable weight relative to a reference weight, utilizing a set of weighing devices each adapted for unloading of product therefrom to contribute to a delivery, said method comprising for each delivery a cycle of steps comprising:

making a combination search to select a combination of said devices to be unloaded to deliver said acceptable weight quantity, said search being made by generating the values of combinations of weights on those weighing devices which were not selected in the preceding search and comparing the values with an acceptable weight standard;

unloading the weighing devices of said selected combination for said delivery; and loading the weighing devices which were unloaded, wherein a cycle is initiated before the termination of the preceding cycle.

6. The method of claim 5 wherein a cycle is initiated before the weighing device selected in the preceding cycle have unloaded, re-loaded and reached stabilization.

7. Apparatus for delivering quantities of product measured by weight with each quantity being of an acceptable weight relative to a reference weight comprising:
   a set of weighing devices each adapted to weigh a fraction of said quantity and each adapted for unloading of product therefrom to contribute to a delivery;
   means for making a combination search to select a combination of said devices to be unloaded to deliver said acceptable weight quantity, said means being operable to make said search by generating the values of combinations of weights on said devices excluding those devices which were selected in the preceding search and comparing the values with an acceptable weight standard;
   means for unloading the weighing devices of the selected combination for said delivery;
   means for loading the weighing devices which were unloaded;
   means for effecting operation of the apparatus in cycles each involving operation of the combination search means, the unloading means and the loading means; and
   means for initiating operation of the apparatus before termination of a preceding cycle.

8. Apparatus as set forth in claim 7 wherein the last-named means is operable to initiate a cycle before the weighing devices which were selected in the search in the preceding cycle have unloaded, re-loaded and reached stabilization.

9. The method of delivering quantities of product measured by weight with each quantity being of an acceptable weight relative to a reference weight, utilizing a set of devices each adapted to hold a weighed fraction of said quantity and each adapted for unloading of product therefrom to contribute to a delivery, said method comprising the steps of:
   making a combination search to select a combination of said devices to be unloaded to deliver said acceptable weight quantity, said search being made by generating the values of combinations of weights on said devices excluding those devices which were selected in the preceding search and comparing the values with an acceptable weight standard;
   unloading the devices of the selected combination for said delivery; and
   loading the devices which were unloaded;
   and wherein the combination search step of generating and comparing the values of the combinations of weights on the devices excluding those devices which were selected in the preceding search is initiated before those devices are reloaded.

10. Apparatus for delivering quantities of product by weight, with each quantity being of an acceptable weight relative to a reference weight, comprising:
   a set of devices each adapted to hold a weighed fraction of said quantity and each adapted for unloading of product therefrom to contribute to a delivery;
   means for making a combination search to select a combination of said devices to be unloaded to deliver said acceptable weight quantity, said means being operable to make said search by generating the values of combinations of weights on said devices excluding those devices which were selected in the preceding search and comparing the values with an acceptable weight standard;
   means for unloading the devices of the selected combination for said delivery;
   means for loading the devices which were unloaded; and
   means for initiating operation of said combination search means to select a combination of weights on the participating devices before those devices selected in the preceding search are reloaded.

11. The method of delivering quantities of product measured by weight with each quantity being of an acceptable weight relative to a reference weight, utilizing a set of devices each adapted for unloading of a weighed amount of product therefrom to contribute to a delivery, said method comprising for each delivery a cycle of steps comprising:
   making a combination search to select a combination of said devices to be unloaded to deliver said acceptable weight quantity, said search being made by generating the values of combinations of weights on devices which were not selected in the preceding search and comparing the values with an acceptable weight standard;
   unloading the devices of said selected combination for said delivery; and
   loading the devices which were unloaded,
   wherein a cycle is initiated before the termination of the preceding cycle.

12. Apparatus for delivering quantities of product measured by weight with each quantity being of an acceptable weight relative to a reference weight comprising:
   a set of devices each adapted to hold a weighed fraction of said quantity and each adapted for unloading of product therefrom to contribute to a delivery;
   means for making a combination search to select a combination of said devices to be unloaded to deliver said acceptable weight quantity, said means being operable to make said search by generating the values of combinations of weights on said devices excluding those devices which were selected in the preceding search and comparing the values with an acceptable weight standard;
   means for unloading the devices of the selected combination for said delivery;
   means for loading the devices which were unloaded;
   means for effecting operation of the apparatus in cycles each involving operation of the combination search means, the unloading means and the loading means; and
   means for intitiating operation of the apparatus before termination of a preceding cycle.

* * * * *

UNITED STATES PATENT AND TRADEMARK OFFICE
CERTIFICATE OF CORRECTION

PATENT NO. : 4,589,506
DATED : May 20, 1986
INVENTOR(S) : Takashi Hirano

It is certified that error appears in the above—identified patent and that said Letters Patent is hereby corrected as shown below:

```
Column 6, line 52, "pllurality" should read -- plurality --.
Column 7, line 40, "e,ovs/Q/ -output" should read -- Q̃-output --.
Column 7, line 49, "Now the" should read -- Now, the --.
Claim 1, column 10, line 9, "device" should read -- devices --.
Claim 6, column 11, line 4, "device" should read -- devices --.
```

Signed and Sealed this

Twenty-first Day of October, 1986

[SEAL]

*Attest:*

DONALD J. QUIGG

*Attesting Officer*   *Commissioner of Patents and Trademarks*